United States Patent
Kim et al.

(10) Patent No.: US 7,327,409 B2
(45) Date of Patent: Feb. 5, 2008

(54) PROJECTION TYPE IMAGE DISPLAY SYSTEM CAPABLE OF COLOR SCROLLING

(75) Inventors: Dae-sik Kim, Suwon-si (KR); Kun-ho Cho, Suwon-si (KR); Sung-ha Kim, Seoul (KR); Hee-joong Lee, Anyang-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 4 days.

(21) Appl. No.: 10/811,375

(22) Filed: Mar. 29, 2004

(65) Prior Publication Data

US 2004/0196644 A1   Oct. 7, 2004

Related U.S. Application Data

(60) Provisional application No. 60/457,914, filed on Mar. 28, 2003.

(30) Foreign Application Priority Data

Jul. 21, 2003   (KR)   ............... 10-2003-0049732

(51) Int. Cl.
   *G02F 1/1335*   (2006.01)
(52) U.S. Cl. ......................................................... 349/5
(58) Field of Classification Search ................ 349/5–9
   See application file for complete search history.

(56) References Cited

U.S. PATENT DOCUMENTS 6,288,815 B1 * 9/2001 Lambert ...................... 359/196
6,493,149 B2 * 12/2002 Ouchi ......................... 359/634
6,619,802 B2 * 9/2003 Janssen et al. ................ 353/31
6,839,095 B2 * 1/2005 Bierhuizen et al. ............ 349/9
2002/0135862 A1 * 9/2002 Dewald ....................... 359/298
2002/0180933 A1 * 12/2002 Ito ................................ 353/20
2002/0191154 A1 * 12/2002 Shahzad et al. .............. 353/20

FOREIGN PATENT DOCUMENTS

| EP | 1 253 787 A2 | 10/2002 |
| JP | 11-281930 A | 10/1999 |
| KR | 1999-002347 A | 1/1999 |

OTHER PUBLICATIONS

JP 2001324760; published Nov. 11, 2001; Minolta Co. Ltd.

* cited by examiner

Primary Examiner—David Nelms
Assistant Examiner—Phu Vu
(74) Attorney, Agent, or Firm—Sughrue Mion, PLLC

(57) ABSTRACT

An image display system includes an illumination system, a light valve, a polarization beam splitter, and at least one polarizing element. The illumination system includes a light source, a color separator, and a scrolling unit. The light valve processes color beams which are scrolled, according to an input image signal and form a color image. The polarization beam splitter transmits or reflects an incident light beam according to polarization so light from the illumination system advances toward the light valve and light from the light valve advances toward a projection lens unit. A polarizing element may be installed at a path of light traveling toward the polarization beam splitter or a path of light that is reflected by the light valve and travels toward the projection lens unit.

18 Claims, 6 Drawing Sheets

PROJECTION TYPE IMAGE DISPLAY SYSTEM CAPABLE OF COLOR SCROLLING

This application claims the priority of Korean Patent Application No. 2003-49732, filed on Jul. 21, 2003, in the Korean Intellectual Property Office, and the benefit of U.S. Patent Provisional Application No. 60/457,914, filed on Mar. 28, 2003, in the U.S. Patent and Trademark Office, the disclosures of which are incorporated herein in their entirety by reference.

BACKGROUND OF THE INVENTION

1. Field of the Invention

The present invention relates to a projection type image display system, and more particularly, to a projection type color scrollable image display system.

2. Description of the Related Art

In conventional projection type image display systems which deliver image information to people, a light valve, such as a liquid crystal display (LCD) or a Digital Micromirror Device (DMD), is used to perform switching for high-speed information processing. The light valve controls the on/off operation of light emitted from a light source (e.g., a high output lamp) on a pixel-by-pixel basis and forms a picture. A magnifying projection optical system provides the picture to a large screen. Projection type image display systems are classified into either 3-panel projection type image display systems or single-panel projection type image display systems, according to the number of light valve panels used. Projection type image display systems try to provide a high luminance for a large screen while using a single panel to overcome a complicated and expensive optical system.

In a projector adopting a conventional single-panel color image display system, white light radiated from a white light source is separated into R, G, and B color beams using a color wheel, and the three color beams are sequentially transmitted to a single light valve. The light valve operates and creates images according to the sequence of color beams received.

These general single-panel color image display systems have smaller optical systems than three-panel projection image display systems, in which different colors are obtained using an optical separation/combination system and images of different colors are created using three light valves. However, these single-panel color image display systems provide only ⅓ of the optical efficiency of the three-panel color image display systems because color wheels are used.

As described above, a single-panel color image display system using a color wheel provides only ⅓ of the light efficiency of a three-panel image display system. A color scrolling method has been designed to increase the optical efficiency of a single-panel color image display system.

According to the color scrolling method, white light is separated into R, G, and B color beams, and the three color beams are sent simultaneously to different locations on a light valve to form R, G, and B color bars. Since an image cannot be produced until each of the R, G, and B color beams reach all pixels of the color areas in the light valve, the color bars are moved at a constant speed by a color scrolling means. The use of the color scrolling method enables a single-panel color image display system to have the light efficiency of a three-panel color image display system.

FIG. 1 shows a single-panel scrolling color image display system disclosed as in U.S. Patent Publication No. 2002/191154 A1. As shown in FIG. 1, white light emitted from a lamp type light source 102 passes through first and second lens arrays 104 and 105 and a polarization conversion system (PCS) 106 and is condensed by a condenser lens 107. The white light is separated into R, G, and B color beams by first through fourth dichroic filters 108, 110, 112, and 114, and the R, G, and B color beams are recombined.

To be more specific, first, the red beam R and the green beam G, for example, are transmitted by the first dichroic filter 108 and advance along a first light path L1, while the blue beam B is reflected by the first dichroic filter 108 and travels along a second light path L2. The red beam R and the green beam G on the first light path L1 are separated by the second dichroic filter 110. The second dichroic filter 110 transmits the red beam R along the first light path L1 and reflects the green beam G along a third light path L3.

The blue beam B and the green beam G that travel along the second and third light paths L2 and L3, respectively, are transmitted and reflected by the third dichroic filter 112, respectively, and then combined. Finally, the R, G, and B beams are combined by the fourth dichroic filter 114. The combined R, G, and B beams are transmitted by a polarization beam splitter (PBS) 128 and are made incident upon a light valve 130. Reference numerals 126 and 132 denote a polarizer and an analyzer, respectively.

First through third prisms 120, 116 and 118 are disposed on the first through third light paths L1, L2, and L3, respectively, and rotate at a uniform speed such that R, G, and B color bars are formed on the light valve 130 and scrolled.

As described above, in a conventional single-panel color image display system, while color separation and color combination are being performed using the first through fourth dichroic filters 108, 110, 112, and 114, the first through third prisms 120, 116, and 118 are rotated to achieve color scrolling.

The scrolling of the R, G, and B color bars due to rotation of the first through third prisms 120, 116, and 118 is shown in FIG. 2. Scrolling represents the movement of color bars formed on the surface of the light valve 130 when the first, second, and third prisms 120, 116, and 118 corresponding to colors are synchronously rotated.

A color image is obtained by processing image information for each of the pixels of the light valve 130 in synchronization with a motion of the color bars. The color image is magnified by a projection lens 134. Then, the magnified image is made incident on a screen.

A conventional single-panel color image display system adopting such a scrolling technique uses different light paths for each color and then recombines the separated beams. The combined beams are sent to the PBS 128 via relay lenses which are installed on the light paths.

Hence, the optical system becomes bulky, and the manufacture and assembly thereof is complicated.

Also, since the three prisms 120, 116, and 118 are separately rotated to perform color scrolling, it is difficult to synchronize this rotation with the driving of the light valve 130.

In order to produce a color picture using a scrolling technique, color bars as shown in FIG. 2 must be moved at a constant speed. The conventional color image display system must synchronize the light valve 130 with the three prisms 120, 116, and 118 in order to achieve scrolling. However, controlling the synchronization is not easy. Due to the circular motion of the scrolling prisms 120, 116, and 118, the color scrolling speed by the three scrolling prisms may be irregular, consequently deteriorating the quality of the resultant image.

Three motors for rotating the three scrolling prisms 120, 116, and 118 generate a lot of noise during operation. Additionally, a color image display system utilizing three motors is manufactured at a greater cost than a color wheel type color image display system which utilizes a single motor.

SUMMARY OF THE INVENTION

The present invention provides a projection type scrollable image display system which can be made more compact by using a single scrolling unit to scroll a plurality of color bars and which can improve a contrast ratio.

The image display system comprises an illumination system, a light valve, a polarization beam splitter, and at least one polarizing element. The illumination system comprises a light source, a color separator for separating an incident light beam according to color, and a scrolling unit which includes at least one lens cell and which converts a rotation of the lens cell into a rectilinear motion of an area of the lens cell through which light passes. The light valve processes color beams, into which the light beam emitted from the illumination system is separated and which are scrolled, according to an input image signal and form a color image. The polarization beam splitter transmits or reflects an incident light beam according to polarization so a light beam received from the illumination system advances toward the light valve and that a light beam reflected by the light valve advances toward a projection lens unit. The at least one polarizing element is installed on at least one of a path of light traveling from the light source toward the polarization beam splitter and a path of light that is reflected by the light valve and travels toward the projection lens unit via the polarization beam splitter. The at least one polarizing element transmits only a light beam with a specific polarization.

The light valve may be a reflective liquid crystal display.

The polarizing element may be a non-absorption polarizing element.

The polarizing element may be one of a wire grid polarizer, a reflective polarizer, and a polarization beam splitter.

The polarizing element may be a polarizer installed in front of the polarization beam splitter and/or an analyzer installed between the polarization beam splitter and the projection lens unit.

The illumination system may further comprise a polarization conversion system which converts a light beam emitted from the light source into a light beam with a single linear polarization.

The at least one lens cell of the scrolling unit may be spirally formed.

The at least one lens cell of the scrolling unit may be a cylindrical lens.

The scrolling unit may be a disk.

When the scrolling unit rotates, a lens array may move rectilinearly in a direction being closer to or distant from a rotation center of the scrolling unit.

The image display system may further comprise first and second fly-eye lenses installed between the scrolling unit and the light valve, each of which comprises a plurality of lens cells corresponding to the lens cells of the scrolling unit so that light beams passed through the scrolling unit are transmitted in a one-to-one correspondence.

The image display system may further comprise a relay lens which is installed between the second fly-eye lens and the light valve and transmits light beams passed through the second fly-eye lens so that light beams of different colors are focused on different locations on the light valve.

The image display system may further comprise a plurality of cylindrical lenses which are disposed in front of and behind the scrolling unit so as to control the width of a light beam incident upon the scrolling unit.

The color separator may include a plurality of reflective dichroic filters to separate a light beam emitted from the light source according to wavelength.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
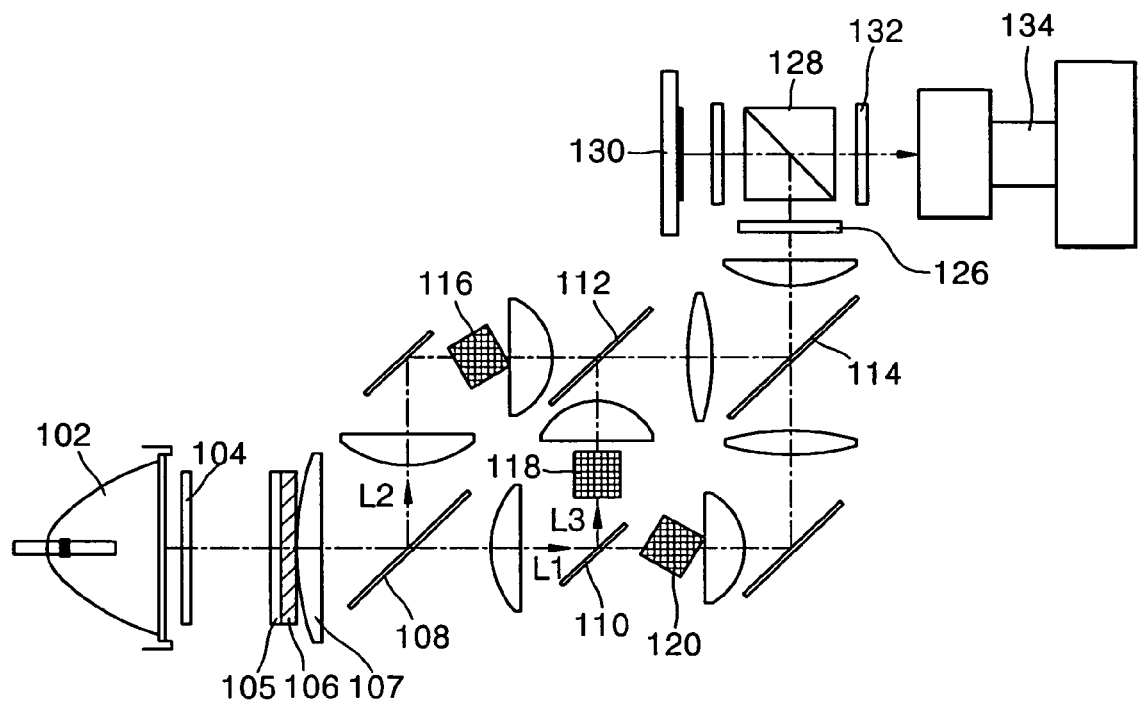
FIG. 1 is a schematic diagram of a conventional single-panel scrolling image display system disclosed in U.S. Patent Publication No. 2002/0191154 A1.
Figure 2:
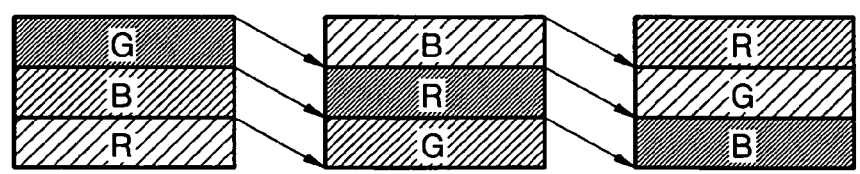
FIG. 2 is an illustration of color scrolling.
Figure 3:
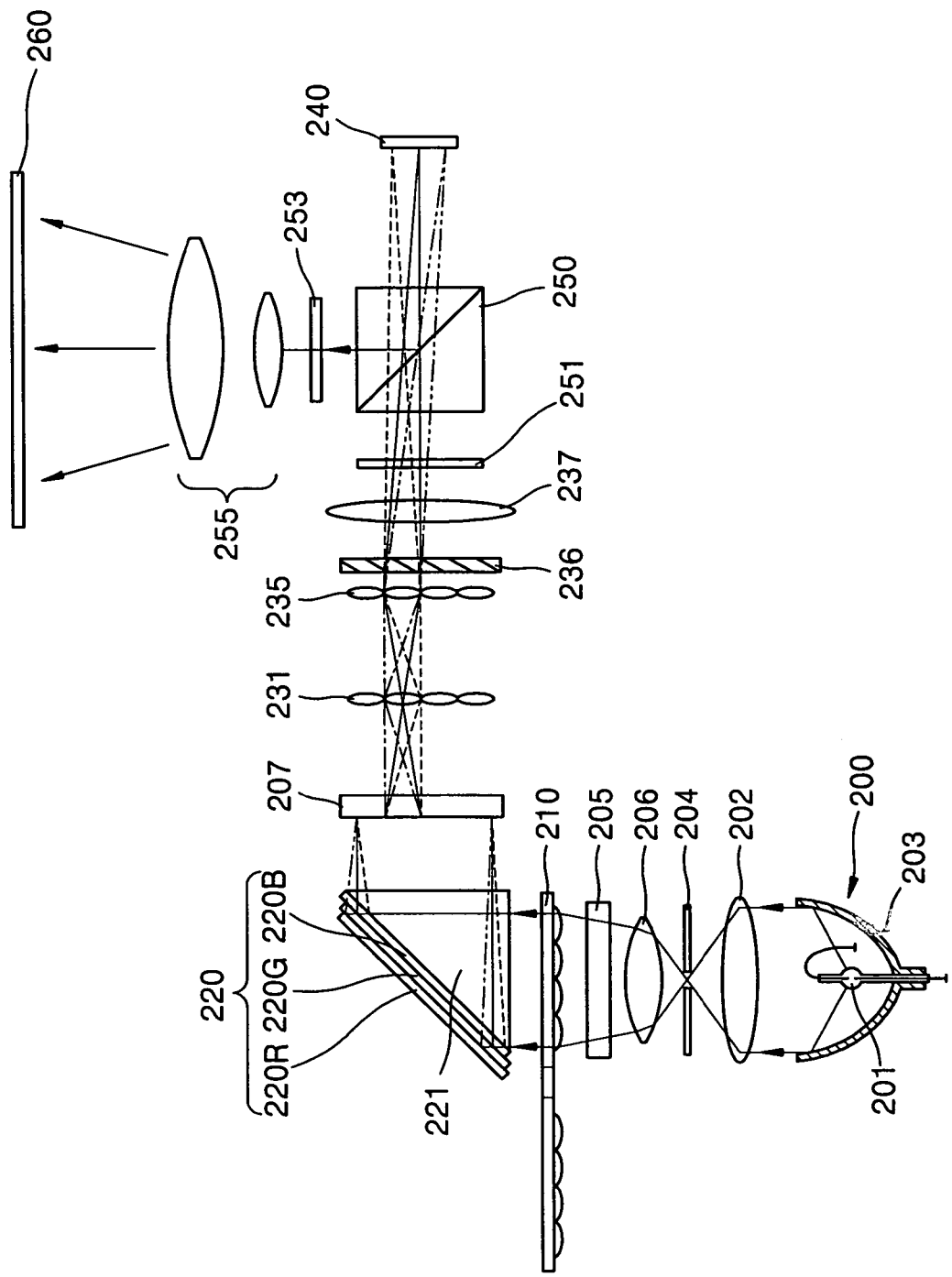
FIG. 3 is a schematic diagram of a projection type image display system according to an exemplary embodiment of the present invention.

Referring to FIG. 3, an image display system according to an exemplary embodiment of present invention comprises an illumination system, a light valve 240, a polarization beam splitter (PBS) 250, and at least one polarizing element, that is, polarizing elements 251 and 253.

The illumination system includes a light source 200, which emits approximately unpolarized light, a color separator 220, which separates incident light according to color, and a scrolling unit 210, which scrolls incident light.

The light source 200 may be a lamp which emits white light. The light source 200 comprises a lamp 201, for generating an approximately unpolarized white light, and a reflection mirror 203, for reflecting the light emitted from the lamp 201 and for guiding the path of the reflected light. The reflection mirror 203 may be an elliptical mirror whose first focal point is the position of the lamp 201 and whose second focal point is a point where light is focused. Alternatively, the reflection mirror 203 may be a parabolic mirror which collimates the light emitted from the lamp 201. The reflection mirror 203 shown in FIG. 3 is a parabolic mirror.

In this case where approximately parallel light is emitted from the light source 200, a focusing lens 202 for focusing the parallel light is also included.

The illumination system further comprises a collimating lens 206 for collimating light that is focused by the focusing lens 202 and then diverged.

The collimating lens 206 is used to reduce the diameter of a light beam emitted from the light source 200, and is disposed so that a light beam emitted from the collimating lens 206 has a diameter of about ⅓ of the diameter of the light beam emitted from the light source 200. The installation of the collimating lens 206 contributes to a miniaturization of an optical system.

Preferably, but not necessarily, a spatial filter 204, having a slit, is further installed on the light path between the light source 200 and the collimating lens 206 so as to control the divergence angle (or etendue) of light emitted from the light source 200. The spatial filter 204 is installed at the focal point of the focusing lens 202. Also, the spatial filter 204 may be formed to adjust the width of the slit in a color separation direction or a color scrolling direction.

If the reflective mirror 203 is an elliptical mirror, a convergent light emitted from the light source 200 is focused at the second focal point of the elliptical mirror 203 and then diverged. Hence, in this case, the focusing lens 202 is not used. The collimating lens 206, for collimating a divergent light, is disposed so that a beam emitted from the collimating lens 206 has a diameter of about ⅓ of the diameter of the beam emitted from the light source 200. The spatial filter 204 is located at the second focal point of the elliptical mirror 203.

If the etendue of the optical system or the divergence angle of the incident light is controlled by the spatial filter 204 as described above, color bars can be accurately separated to improve the quality of an image. Light diverged from the light source 200 at an angle grater than an acceptance angle of the optical system may cause color bars to be partially overlapped. Hence, the spatial filter 204 removes the light diverged at an angle greater than the acceptance angle of the optical system so that the color bars can be accurately separated.

Also, if a liquid crystal display (LCD) is used as the light valve 240, an image signal can be smoothly processed by reducing the sizes of the color bars by controlling the width of the slit of the spatial filter 204 to form black bars. In other words, when color bars are consecutively scrolled, the LCD may not be able to consecutively process image signals that are changed every time the color bars are changed. In this case, a period of time to process an image signal is required between color bars. To obtain this period of time, black bars are used between adjacent color bars. The black bars can be formed by adequately controlling the width of the slit of the spatial filter 204.

Etendue denotes an optical conservation quantity in an optical system. Given that a starting point of an optical system is a light source and an object of the optical system is a light valve, if the etendue of the light source is greater than that of the entire optical system, the sizes of color bars are increased. Hence, colors may be mixed at boundaries between color bars. On the other hand, if the etendue of the light source is smaller than that of the entire optical system, the sizes of color bars are decreased, and thus, black bars are formed between color bars. Since the spatial filter 204 can control the etendue of the light source, colors can be prevented from being mixed at the boundaries between color bars. Also, black bars can be formed between color bars if desired.

The spatial filter 204 may have a different structure according to purpose. For example, the spatial filter 204 may be constructed to independently control the size of each of the color bars, thereby improving a color gamut and controlling a color balance.

The color separator 220 comprises a plurality of dichroic filters, namely, first, second, and third dichroic filters 220B, 220G, and 220R, for separating white light radiated from the light source 200 according to wavelength.

FIG. 3 shows an example in which the color separator 220 comprises first, second, and third dichroic filters 220B, 220G, and 220R, respectively for reflecting a blue (B) beam, a green (G) beam, and a red (R) beam so that white light radiated from the light source 200 is separated into the B, G, and R beams. In FIG. 3, the first, second, and third dichroic filters 220B, 220G, and 220R are installed parallel to one another. However, the color separator 220 may have a different structure.

In other words, the first, second, and third dichroic filters 220B, 220G, and 220R of the color separator 220 may be disposed aslant at different angles from one another. Also, the color separator 220 may be replaced by an optical pipe which comprises a plurality of dichroic prisms. Each of the dichroic prisms includes a dichroic filter installed at an angle with respect to light emitted from the light source 200, which reflects an incident color beam.

Also, in FIG. 3, a prism 221 is additionally included between the scrolling unit 210 and the color separator 220 so as to transfer an incident light to the color separator 220 without changing the path of the light. The prism 221 is optional.

The first, second, and third dichroic filters 220B, 220G, and 220R reflect the B, G, and R beams, respectively, and transmit all other color beams.

For example, if the color separator 220 including the first, second, and third dichroic filters 220B, 220G, and 220R receives white light from the light source 200, the first dichroic filter 220B reflects a B beam from the white light and, at the same time, transmits R and G beams. The second dichroic filter 220G reflects the G beam from the beams transmitted by the first dichroic filter 220B and, at the same time, transmits the R beam. The third dichroic filter 220R reflects the R beam transmitted by the second dichroic filter 220G.

The sequence in which the first, second, and third dichroic filters 220B, 220G, and 220R are arranged may vary.

Preferably, but not necessarily, the first, second, and third dichroic filters 220B, 220G, and 220R are disposed at an interval that is determined so that the B, G, and R beams obtained by the color separator 220 can enter identical lens cells of a first fly-eye lens 231 without being mixed.

When a single-panel color image display system adopts a color scrolling technique, it can obtain the light efficiency provided by a three-panel color image display system.

In the color scrolling technique, white light is separated into a plurality of color beams, for example, R, G, and B beams, the color beams are simultaneously sent to different locations on the light valve 240 to form a plurality of color bars, and the color bars are scrolled at a constant speed so that a plurality of color beams can reach each pixel of the light valve 240, thereby forming a color image.

When the white light is separated into the R, G, and B beams, the R, G, and B color bars must reach different areas each corresponding to about ⅓ of the entire area of the light valve 240. Also, since an image cannot be produced until each of the R, G, and B color beams reach each of the pixels of the light valve, the color bars are moved at a constant speed by a color scrolling means.

The image display system according to the present invention includes the scrolling unit 210 to achieve such color scrolling.

Also, the image display system according to the present invention further includes first and second fly-eye lenses 231 and 235 disposed on the light path between the scrolling unit 210 and the light valve 240. A relay lens 237 is further installed between the second fly-eye lens 235 and the light valve 240.

Figure 4:
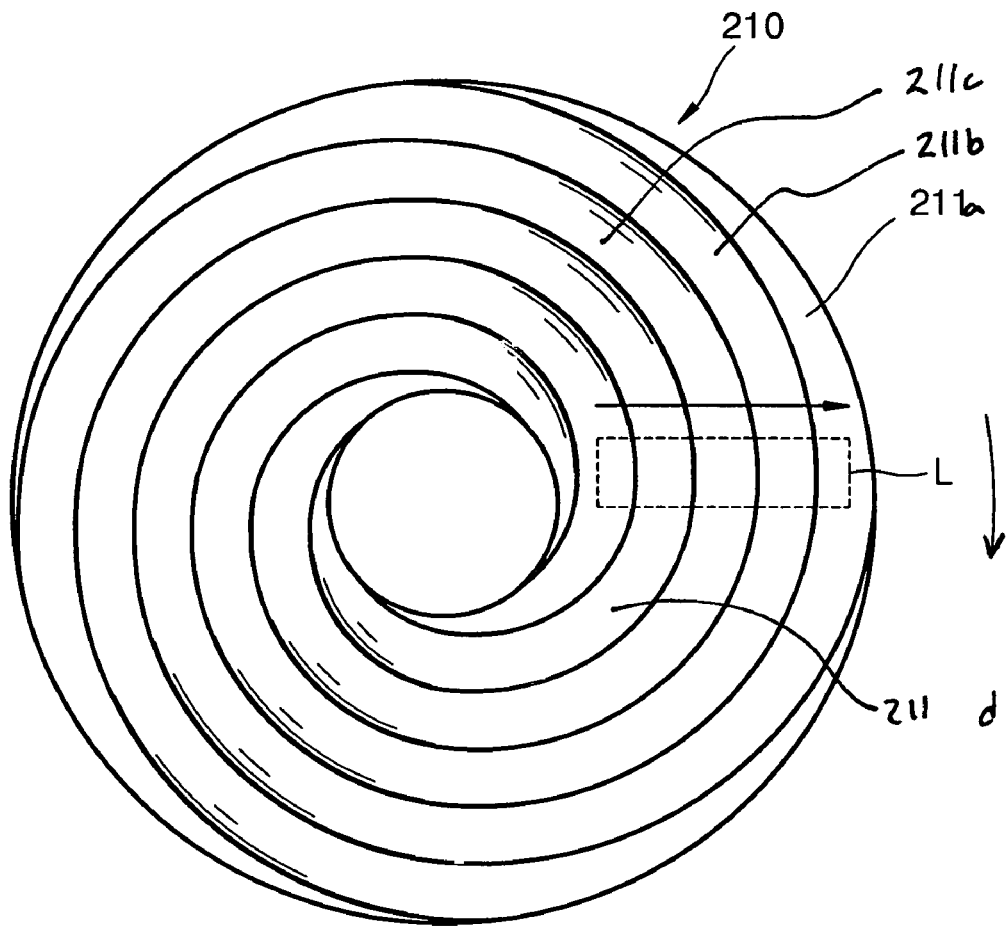
FIG. 4 is a front view of the scrolling unit of FIG. 3.

Furthermore, the image display system according to the present invention includes first and second cylindrical lenses 205 and 207 respectively disposed in front of and behind the scrolling unit 210 so that a beam with a reduced width as shown in FIG. 4 can pass through the scrolling unit 210. The first cylindrical lens 205 reduces the width of an incident light beam only in one direction so that a beam incident upon the scrolling unit 210 can have the cross-sectional shape of a box whose width is narrow as shown in FIG. 4. Accordingly, light loss can be reduced, and the beam transmitted by the scrolling unit 210 can be restored to its original width by the second cylindrical lens 207.

As illustrated in FIG. 4, the scrolling unit 210 comprises at least one lens cell, such as lens cells 211a-211d. The scrolling unit 210 scrolls a plurality of color beams by converting the rotation of the lens cells 211a-211d into the rectilinear motion of an area of the lens cells 211a-211d through which light passes.

In FIG. 4, the scrolling unit 210 is a disk on which the lens cells 211a-211d are spirally arranged to obtain an effect where a rotation of the scrolling unit 210 simulates a rectilinear motion of a lens array.

As shown in FIG. 4, when the lens cells 211a-211d are spirally arranged to form the scrolling unit 210, they are preferably, but not necessarily, disposed at equal intervals and have identical cross-sections.

Figure 5:
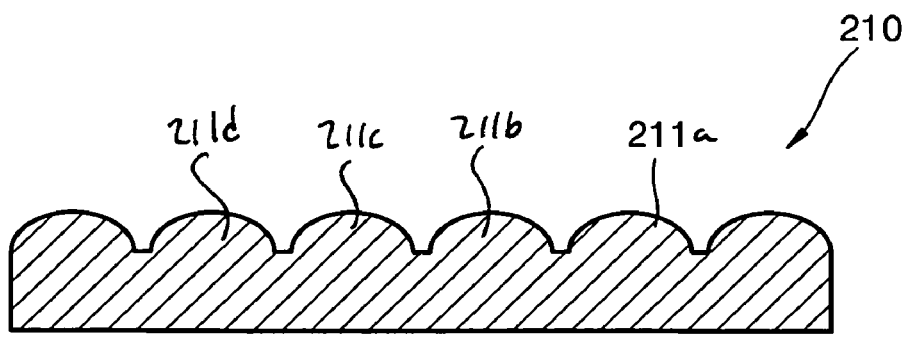
FIG. 5 is a cross-section of lens cells of the scrolling unit of FIG. 3.

As shown in FIG. 5, the lens cells 211a-211d of the scrolling unit 210 may have circular arc cross-sections. Alternatively, the lens cells 211a-211d of the scrolling unit 210 may be diffraction optical elements or hologram optical elements.

Each of the lens cells 211a-211d of the scrolling unit 210 focuses light radiated from the light source 200 and scrolls color bars as described later with a rotation of the scrolling unit 210.

When the scrolling unit 210 including the spiral lens cells 211a-211d is rotated by a motor, the rotation of the spiral lens cells 211a-211d is converted into a rectilinear motion of the lens array so that scrolling is performed.

In other words, since the lens cells 211a-211d are spirally arranged, when the disk type scrolling unit 210 rotates clockwise at a constant speed, it can be seen from the view point of a beam L passing through a particular location of the scrolling unit 210 that the cylindrical lens array rectilinearly moves outward at a constant speed. By rotating the disk in the clockwise or counter-clockwise direction, the rectilinear motion of the lens array appears to be either outward or inward toward the center of the scrolling unit 210.

Since a beam with a width reduced by the first cylindrical lens 205, as illustrated in the box of FIG. 4, passes through the scrolling unit 210, an effect can be obtained whereby the beam L appears to pass through a lens array that moves rectilinearly.

Hence, as the scrolling unit 210 rotates at a constant speed, the R, G, and B beams obtained by the color separator 220 are repeatedly scrolled, and thus, the color bars on the light valve 240 are scrolled.

In the case where the scrolling unit 210 is used, since the scrolling unit 210 continuously rotates in one direction without changing the rotation direction in order to perform scrolling, continuity and consistency of color scrolling can be guaranteed. In addition, since the single scrolling unit 210 can scroll a plurality of color bars, the scrolling speed of the color bars is kept constant.

The number of spiral lens cells 211 on the scrolling unit 210 or the rotation speed of the scrolling unit 210 can be controlled to synchronize the scrolling unit 210 with the operating frequency of the light valve 240. That is, if the operating frequency of the light valve 240 is high, more lens cells 211 are included so that the scrolling speed can be controlled to be faster while keeping the rotation speed of the scrolling unit 210 constant. The scrolling speed can also be controlled to be faster by maintaining the number of lens cells 211 uniform and increasing the rotation frequency of the scrolling unit 210.

Referring to FIG. 3, the image display system according to the present invention includes the scrolling unit 210, which comprises a single disk. However, the scrolling unit 210 may be replaced by a scrolling unit 210', which comprises a plurality of disks, on each of which at least one lens cell is formed as shown in FIG. 6.

Figure 6:
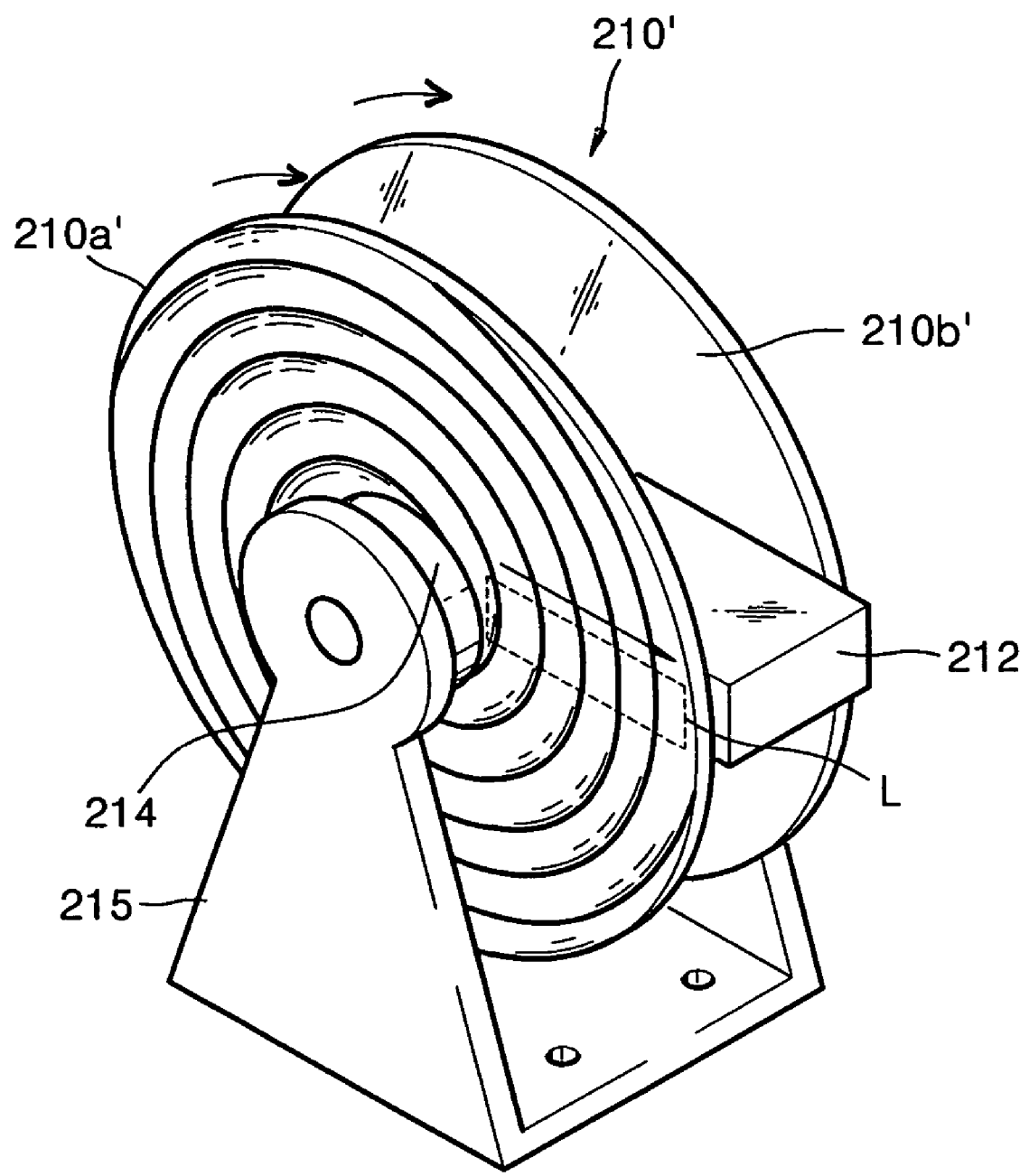
FIG. 6 is a perspective view of an alternate scrolling unit according to the exemplary embodiment of FIG. 3.

As shown in FIG. 6, the scrolling unit 210' includes first and second disks 210a' and 210b' disposed a predetermined distance apart from each other. The first disk 210a' is formed by spirally arranging at least one lens cell 211 and scrolls an incident beam. The second disk 210b' is also formed by spirally arranging at least one lens cell 211 as in the first disk 210a' so as to correct the divergence angle of light emitted from the first disk 210a'. Each of the first and second disks 210a' and 210b' is substantially the same as the single disk of the scrolling unit 210 of FIG. 4.

Preferably, but not necessarily, a glass rod 212 is installed between the first and second disks 210a' and 210b' so as to control the divergence angle of light emitted from the first disk 210a'. The use of the glass rod 212 enables a beam converged by the lens cells of the first disk 210a' to be transferred to the second disk 210b' without being diverged.

The first and second disks 210a' and 210b' are supported by a bracket 215 so that they can be rotated at a uniform speed by a driving source 214.

As described above, the scrolling unit 210 may be formed by disposing two disks, on each of which at least one lens cell is spirally arranged, on an identical driving axis so that color scrolling is performed. Of course, in this case, the scrolling speed of color bars can be kept constant. The scrolling unit 210 may have various structures. For example, the scrolling unit 210 may be a cylinder on an outer circumference of which lens cells are spirally arranged.

A feature of the image display system of the present invention is that the scrolling unit 210 is formed into a single body that can scroll a plurality of color beams.

As illustrated in FIG. 3, if the dichroic filters of the color separator 220 are installed in parallel to each other, the scrolling unit 210 is installed between the light source 200 and the color separator 220. A beam converged by the scrolling unit 210 is separated according to color by the color separator 220. Because light paths of the separated color beams have different lengths due to selective reflection by the dichroic filters of the color separator 220, the separated color beams can enter the first fly-eye lens 231 without being mixed.

On the other hand, if the dichroic filters of the color separator 220 are disposed aslant at different angles, or an optical pipe is used as the color separator 220, the scrolling unit 210 is disposed between the color separator 220 and the light valve 240.

The lens cells of the first fly-eye lens 231 match with those of the second fly-eye lens 235 in a one-to-one correspondence, and the lens cells of each of the first and second fly-eye lenses 231 and 235 match with the lens cells 211 of the scrolling unit 210 in a one-to-one correspondence.

Preferably, but not necessarily, the first fly-eye lens 231 is located around a focal plane of the scrolling unit 210 so that the color beams into which a beam passes through the scrolling unit 210 and is separated by the color separator 220 can be incident upon each of the lens cells of the first fly-eye lens 231 without being mixed.

In this case, the separated color beams are incident upon different locations on each of the lens cells of the first fly-eye lens 231.

While the color beams are passing through the first fly-eye lens 231, each of the color beams is changed from a convergent beam to a divergent beam, and the color beams are combined and collimated by the second fly-eye lens 235.

The relay lens 237 transmits the collimated color beams transmitted by the first and second fly-eye lenses 231 and 235 so that the collimated color beams can land at different locations on the light valve 240 and form color bars. In FIG. 3, the relay lens 237 is a single lens. However, the relay lens 237 may be a lens group of two or more lenses.

When the first and second fly-eye lenses 231 and 235 and the relay lens 237 are included, light converged by the scrolling unit 210 is transmitted in one-to-one correspondence by the first and second fly-eye lenses 231 and 235, and the transmitted light is focused on the light valve 240 via the relay lens 237 so that bars of different colors are formed on the light valve 240.

The first cylindrical lens 205 reduces the width of a beam emitted from the light source 200 so that a beam with a reduced width can be incident upon the scrolling unit 210. The second cylindrical lens 207 restores the beam with a reduced width transmitted by the scrolling unit 210 to its original state.

When the first cylindrical lens 205 is installed in front of the scrolling unit 210 so that a light beam which is emitted from the light source 200 and reduced in width by the first cylindrical lens 205 as illustrated in the box of FIG. 4 passes through the scrolling unit 210, an effect where the beam L look to pass through the lens array that rectilinearly moves can be obtained.

Hence, as the scrolling unit 210 rotates at a constant speed, the R, G, and B beams obtained by the color separator 220 are repeatedly scrolled, and thus, the color bars on the light valve 240 are scrolled.

Figure 7A:
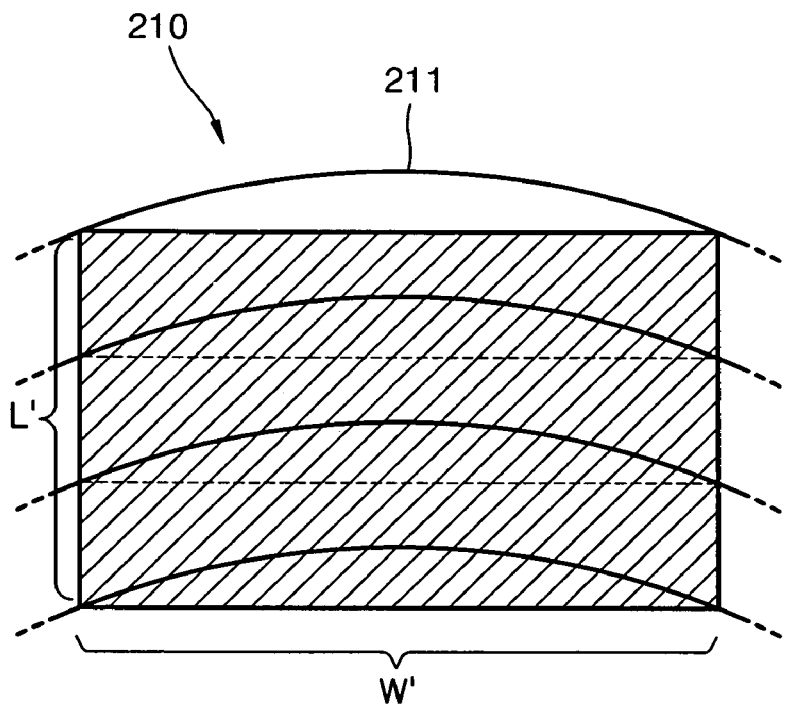
FIG. 7A illustrates the width of a beam that is emitted from a light source and is incident on a scrolling unit without change.
Figure 7B:
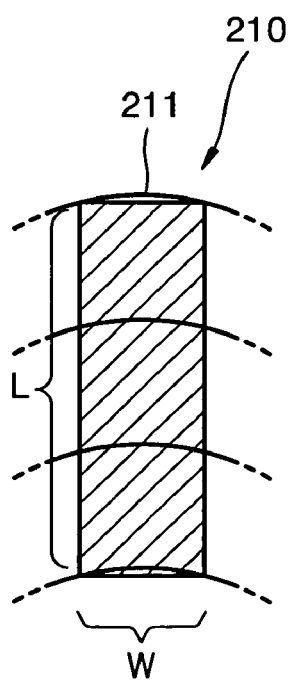
FIG. 7B illustrates the width of a beam that is emitted from the light source, reduced in width by a first cylindrical lens, and then incident upon the scrolling unit.

FIG. 7A shows the cross-section of a beam L' incident on the scrolling unit 210 without passing through the first cylindrical lens 205. Beam L' has a width W'. FIG. 7B shows the cross-section of a beam L having a width W, reduced by the first cylindrical lens 205, which is then incident upon the scrolling unit 210. In the case of the beam L', that is, when a beam passing through the scrolling unit 210 is relatively wide, the curved shape of the spiral lens cell 211 does not match with that of the beam L', and thus there is light loss.

To minimize the light loss, the first cylindrical lens 205 is provided to produce the beam L with a reduced width, as shown in FIG. 7B. The shape of the spiral lens cell 211, as shown in FIG. 7B, aligns more closely with that of the beam L. Consequently, the light loss is reduced by the use of the first cylindrical lens 205.

In other words, the light loss can be reduced by controlling the width of a beam using the first and second cylindrical lenses 205 and 207.

Referring back to FIG. 3, the light valve 240 controls color beams received in a bar shape according to an image signal, thereby forming a color image.

In the image display system according to the present invention, the light valve 240 is preferably, but not necessarily, of a polarization-dependent type. A reflective LCD, for example, a reflective Liquid Crystal on Silicon (LCOS), may be used as the light valve 240.

Color bars formed on the light valve 240, for example, R, G, and B color bars, are scrolled as the scrolling unit 210 rotates. When the image information for each of the pixels of the light valve is processed in synchronization with the motion of the color bars, a color image is formed. The color image formed by the light valve 240 is magnified by a projection lens unit 255 and projected onto a screen 260.

The PBS 250 transmits or reflects incident light according to polarization in order to direct light received from the illumination system toward the light valve 240 and to direct light reflected by the light valve 240 toward the projection lens unit 255.

For example, the PBS 250 transmits a light beam having a first linear polarization of the light received from the illumination system so that the light beam with the first linear polarization can advance toward the light valve 240. Also, the PBS 250 reflects a light beam having a second linear polarization, which is orthogonal to the first linear polarization, of light reflected by the light valve 240 so that the light beam with the second linear polarization can advance toward the projection lens unit 255.

If the light received from the illumination system by the PBS 250 is not 100% polarized in the first linear direction, but includes some light with the second linear polarization, the PBS 250 may reflect the received light with the second linear polarization as well as the light with the first linear polarization of the light received from the illumination system. Also, the PBS 250 may reflect some light with the first linear polarization as well as the light with the second linear polarization of the light received by the light valve 240. This is because the extinction ratio of the PBS 250 cannot be zero, as is well known. Since the manufacturing costs of the PBS 250 increase as the extinction ratio improves, it is difficult for the PBS 250 to have a high quality extinction ratio.

Hence, at least one polarizing element, for example, polarizing elements 251 and 253, is further installed to transmit only light with a specific polarization in order to increase the color purity and contrast of an image.

The polarizing element 251 or 253 is disposed on either the path of light that advances from the light source 200 toward the PBS 250 or the path of light that is reflected by the light valve 240 toward the projection lens unit 255 via the PBS 250.

In FIG. 3, the polarizing elements 251 and 253 are disposed on the path of light that advances from the light source 200 toward the PBS 250 and the path of light that is reflected by the light valve 240 toward the projection lens unit 255 via the PBS 250, respectively.

The polarizing element 251, which is disposed on the path of light that advances from the light source 200 toward the PBS 250, serves as a polarizer so that only light with the first linear polarization is incident upon the PBS 250. The light with the first linear polarization is transmitted by the PBS 250 toward the light valve 240.

The polarizing element 253, which is disposed on the path of light that is reflected by the light valve 240 toward the projection lens unit 255 via the PBS 250, serves as an analyzer so that only light with the second linear polarization of light that is reflected by the light valve 240 and again by the PBS 250 can be transmitted toward the projection lens unit 255.

Preferably, but not necessarily, the illumination system further includes a polarization conversion system (PCS) 236 for converting an approximately unpolarized light beam emitted from the lamp type light source 200 into a light beam with a single linear polarization, that is, the first linear polarization. In FIG. 3, the PCS 236 is installed between the second fly-eye lens 235 and the relay lens 237. However, the position of the PCS 236 may vary. For example, the PCS 236 may be disposed between the light source 200 and the scrolling unit 210, or, between the spatial filter 204 and the collimating lens 206.

The approximately unpolarized light beam emitted from the lamp type light source 200 includes light with one polarization and light with the other polarization at a ratio of about 50:50. As is well know in the field of the present invention, the PCS 236 converts the approximately unpolarized light beam into a light beam with a single polarization. Here, the approximately unpolarized light beam means that the ratio of light with one polarization to light with the other polarization is not exactly 50:50 but may vary somewhat. Accordingly, the polarization of light emitted from the light source 200 must be interpreted in this sense throughout the specification.

For example, the PCS 236 includes a PBS, a reflection member, and a half wave-plate. As disclosed in U.S. Patent Publication No. 2002/0191154 A1, the PCS 236 may include a small PBS, a reflection member, and a half wave-plate which are arranged in an array. Alternatively, the PCS 236 may include a single PBS, a single reflection member, and a single half wave-plate.

The PBS of the PCS 236 transmits a light beam with one linear polarization of light received from the light source 200 and reflects a light beam with the other linear polarization. The reflection member re-reflects the light beam reflected by the PBS so that the re-reflected light beam can travel parallel to the light beam transmitted by the PBS. The half wave-plate is, for example, installed on the path of the light beam with the other linear polarization and converts the light beam with the other linear polarization into the light beam with the polarization transmitted by the PBS. Consequently, the PCS 236 emits a light beam with a single polarization, for example, a light beam with the first linear polarization.

The half wave-plate can exactly change, for example, a second linear polarization of light with a specific wavelength, to a first linear polarization. However, the half wave-plate cannot exactly change a second linear polarization of light with a wavelength other than the specific wavelength to the first linear polarization. A percentage of the second linear polarization changed to the first linear polarization may vary according to the wavelength of light. Also, as described above, the PBS cannot perfectly transmit only the light beam with one linear polarization or reflect only the light beam with the other linear polarization. The light beam transmitted by the PBS includes some light with the other linear polarization. Likewise, the light beam reflected by the PBS includes some light with one linear polarization. Due to these characteristics of the half waveplate and the PBS, light beams of all wavelengths emitted from the light source 200 cannot be perfectly changed to light beams with a single linear polarization.

Hence, although the PCS 236 is included in the image display system according to the present invention, light emitted from the illumination system and incident upon the PBS 250 is not 100% the light having the first linear polarization.

However, since the image display system according to the present invention includes at least one polarizing element (e.g., the polarizing element 251 or 253), which serves as a polarizer and/or an analyzer, any influence from a light beam not having the first linear polarization by the PCS 236 can be prevented.

Consequently, if at least one polarizing element (e.g., the polarizing element 251 or 253) is included to serve as a polarizer and/or an analyzer, the color purity and contrast of an image can be increased. Also, due to the use of the PCS 236, almost all the light emitted from the light source 200 can be used, thus increasing light efficiency.

In the image display system according to the present invention, the polarization elements 251 and 253 are preferably, but not necessarily, non-absorption polarizing elements.

Figure 8:
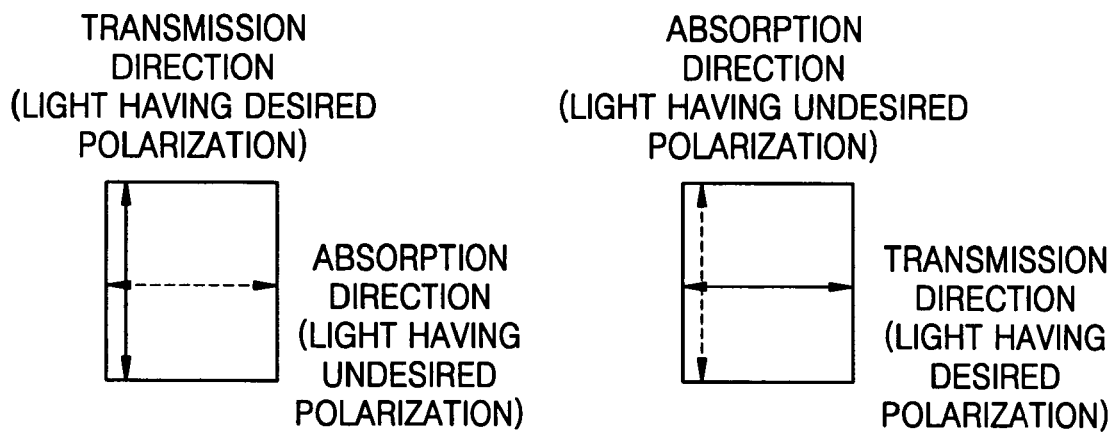
FIG. 8 illustrates absorption and transmission of light according to the direction of polarization in a general absorption polarizing element.
Figure 9:
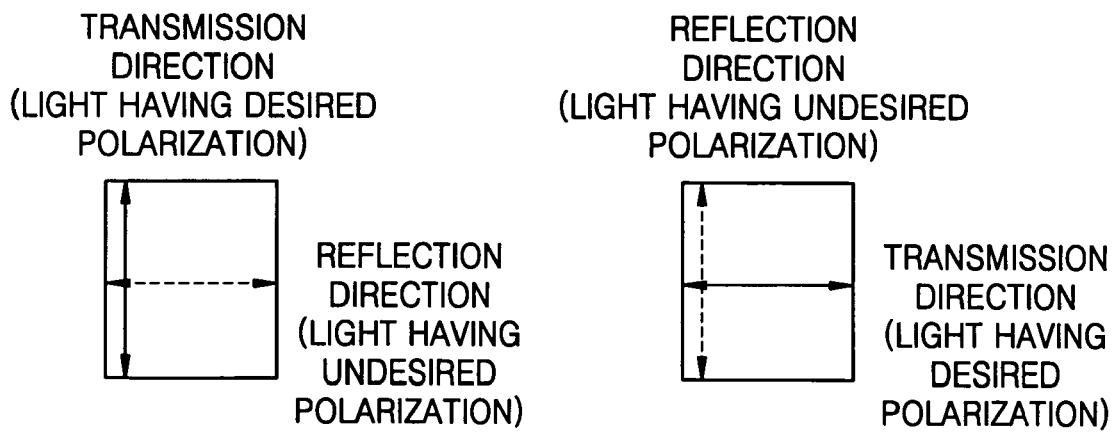
FIG. 9 illustrates absorption and transmission of light according to the direction of polarization in a non-absorption polarizing element.

FIG. 8 illustrates absorption and transmission of light according to a polarization direction in a general absorption polarizing element. FIG. 9 illustrates reflection and/or transmission of light according to a polarization direction in a non-absorption polarizing element.

In FIG. 8, an absorption polarizing element on the left side transmits only light polarized in a vertical axis, and an absorption polarizing element on the right side transmits only light polarized in a horizontal axis. In FIG. 9, a non-absorption polarizing element on the left side transmits only light polarized in a vertical axis, and a non-absorption polarizing element on the right side transmits only light polarized in a horizontal axis.

As illustrated in FIG. 9, each of the polarizing elements 251 and 253 included in an image display system according to the present invention is preferably, but not necessarily, a non-absorption polarizing element which transmits light having one polarization and reflects light having the other polarization (i.e., non-used light), that is, a non-absorption polarizing element which transmits desired light and reflects undesired light. The non-absorption polarizing element may be a wire grid polarizer as disclosed in U.S. Pat. No. 6,122,103 or a reflective polarizer disclosed in U.S. Pat. No. 6,025,897. Alternatively, the non-absorption polarizing element may be a general PBS.

A wire grid polarizer is formed by arranging conductive wire grids at regular intervals on a transparent substrate. The wire grid polarizer reflects light having one polarization of incident light and transmits light having the other polarization. If the wire grid polarizer is used as a polarizing element, it is disposed at an angle. A reflective polarizer is formed by arranging an isotropic material and transmits light having one polarization and reflects light having the other polarization.

Alternatively, an absorption polarizing element as shown in FIG. 8 may be used as a polarizing element included in the image display system according to the present invention.

A non-absorption polarizing element, such as, a wire grid polarizer or a reflective polarizer, may be used not only as a polarizer and/or an analyzer but also as the PBS of the PCS 236. Also, the wire grid polarizer may be used as the PBS 250.

An operation of the image display system according to the present invention will now be described with reference to the optical system of FIG. 3.

First, approximately unpolarized white light emitted from the light source 200 is focused by the focusing lens 202, and the incidence angle or etendue of the focused white light is controlled by the spatial filter 204. Light passed through the spatial filter 204 is collimated by the collimating lens 206. The width of the collimated light is reduced by the first cylindrical lens 205, and light with the reduced width is incident upon the scrolling unit 210.

Light passed through the scrolling unit 210 is separated into R, G, and B beams, for example, by the color separator 220. The R, G, and B beams are incident upon different locations on each of the lens cells of the first fly-eye lens 231, which is located around a focal plane of the scrolling unit 210. At this time, the previously reduced width of the light is returned to the original width by the second cylindrical lens 207.

While the R, G, and B beams are passing through the first fly-eye lens 231, they are changed from convergent beams to divergent beams. The R, G, and B divergent beams are combined by the second fly-eye lens 235 and also collimated by the second fly-eye lens 235 to form parallel beams.

The R, G, and B parallel beams passed through the first and second fly-eye lenses 231 and 235 are changed to R, G, and B beams having a single linear polarization by the PCS 236. The R, G, and B beams having a single linear polarization pass through the relay lens 237 and are made incident upon different locations on the light valve 240, thereby forming R, G, and B color bars.

More specifically, only a light beam with a first linear polarization, for example, of the light passed through the relay lens 237 is transmitted by the polarizing elements 251, which serves as a polarizer, and is again transmitted by the PBS 250 toward the light valve 240. If the light valve 240 is a polarization-dependent display device, such as a reflective LCD, the polarization of a light beam reflected by the light valve 240 is changed according to an image signal. Hence, a light beam with a second linear polarization corresponding to the image signal of the light beam reflected by the light valve 240 is reflected by the PBS 250, passes through the polarizing element 253, which serves as an analyzer, and is directed toward the projection lens unit 255. The light beam with the second linear polarization is magnified by the projection lens unit 255 and projected onto the screen 260.

The R, G, and B color bars formed on the light valve 240 are scrolled with a rotation of the scrolling unit 210.

In other words, as the scrolling unit 210, in which at least one lens cell is spirally arranged, rotates, an area of the lens array through which light passes appears to rectilinearly move either closer to or farther from the rotation center of the scrolling unit 210. Hence, if color bars are first formed on the light valve 240 in an R, G, and B order, locations on the first fly-eye lens 231 upon which the R, G, and B beams are incident are changed with the rotation of the scrolling unit 210, and accordingly, the R, G, and B order is changed to a G, B, and R order. The G, B, and R order is changed to the B, R, and G order, and the B, R, and G order is then returned to the R, G, and B order. Such scrolling is repeated periodically.

Hence, when the scrolling unit 210 is rotated in synchronization with an image signal which controls the light valve 240 on a pixel-by-pixel basis, the R, G, and B color bars are scrolled to form a color image.

As described above, since an image display system according to the present invention can scroll all color bars by using a single scrolling unit and accordingly have a single-plate structure that uses a single light valve, the size of the image display system is reduced.

Also, since the image display system according to the present invention includes at least one polarizing element as a polarizer and/or analyzer, the color purity and contrast of a color image can be improved.

Furthermore, when the image display system according to the present invention includes a PCS, almost all light emitted from a lamp type light source can be used, thus increasing the light efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display system comprising:
   an illumination system, comprising:
   a light source,
   a color separator which separates an incident light beam according to color, and
   a scrolling unit, comprising plurality of spirally-arranged lens cells, which converts a rotation of the lens cell into a rectilinear motion of an area of the lens cell through which light passes;
   a light valve,
   which processes color beams, into which the light beam emitted from the illumination system is separated and which are scrolled, according to an input image signal, and
   which forms a color image;
   a polarization beam splitter, which transmits or reflects incident light beams according to polarization so that a light beam received from the illumination system advances toward the light valve and so that a light beam reflected by the light valve advances toward a projection lens unit; and
   at least one polarizing element, which is installed on at least one of a path of light traveling from the light source toward the polarization beam splitter and a path of light that is reflected by the light valve and travels toward the projection lens unit via the polarization beam splitter and which transmits only a light beam with a specific polarization.

2. The image display system of claim 1, wherein the light valve is a reflective liquid crystal display.

3. The image display system of claim 1, wherein the at least one polarizing element is a non-absorption polarizing element.

4. The image display system of claim 3, wherein the at least one polarizing element is one of a wire grid polarizer, a reflective polarizer, and a polarization beam splitter.

5. The image display system of claim 4, wherein the at least one polarizing element is at least one of a polarizer installed between the illumination system and the polarization beam splitter and an analyzer installed between the polarization beam splitter and the projection lens unit.

6. The image display system of claim 3, wherein the at least one polarizing element is at least one of a polarizer installed between the illumination system and the polarization beam splitter and an analyzer installed between the polarization beam splitter and the projection lens unit.

7. The image display system of claim 1, wherein the polarizing element is a polarizer installed in front of the polarization beam splitter and/or an analyzer installed between the polarization beam splitter and the projection lens unit.

8. The image display system of claim 1, wherein the illumination system further comprises a polarization conversion system which converts a light beam emitted from the light source into a light beam with a single linear polarization.

9. The image display system of claim 1, wherein the plurality of spirally-arranged lens cells of the scrolling unit are cylindrical lenses.

10. The image display system of claim 1, wherein the scrolling unit is a disk.

11. The image display system of claim 1, wherein the scrolling unit is a disk.

12. The image display system of claim 1, wherein when the scrolling unit rotates, a lens array moves rectilinearly in a direction being closer to or distant from a rotation center of the scrolling unit.

13. The image display system of claim 1, further comprising first and second fly-eye lenses, installed between the scrolling unit and the light valve, each comprising a plurality of lens cells corresponding to the lens cells of the scrolling unit, so that light beams passed through the scrolling unit are transmitted in a one-to-one correspondence.

14. The image display system of claim 13, further comprising a relay lens, installed between the second fly-eye lens and the light valve, which transmits light beams passed through the second fly-eye lens so that light beams of different colors are focused on different locations on the light valve.

15. The image display system of claim 13, further comprising a plurality of cylindrical lenses disposed in front of and behind the scrolling unit so as to control the width of a light beam incident upon the scrolling unit.

16. The image display system of claim 1, further comprising a plurality of cylindrical lenses disposed in front of and behind the scrolling unit so as to control the width of a light beam incident upon the scrolling unit.

17. The image display system of claim 1, wherein the color separator comprises a plurality of reflective dichroic filters to separate a light beam emitted from the light source according to wavelength.

18. The image display system of claim 1, wherein the color separator separates the light beam emitted from the light source into a plurality of color beams by selectively reflecting light with a specific wavelength from the light beam emitted from the light source.

* * * * *